United States Patent

Boffelli et al.

[19]

[11] Patent Number: 6,013,003
[45] Date of Patent: Jan. 11, 2000

[54] MULTISPEED DRIVE FOR ENGINE-COOLING FAN

[75] Inventors: Piercarlo Boffelli, Milan; Erminio Depoli, Crema; Fabio Natale, San Donato Milanese; Claudio Bellotti, Cerro Al Lambro, all of Italy

[73] Assignee: Baruffaldi S.P.A., San Donato Milanese, Italy

[21] Appl. No.: 09/094,962

[22] Filed: Jun. 12, 1998

[30] Foreign Application Priority Data

Jun. 19, 1997 [IT] Italy .................................. MI97A1447

[51] Int. Cl.[7] .................................................. F16D 27/08
[52] U.S. Cl. ........................ 475/149; 475/153; 192/84.21; 192/84.31
[58] Field of Search ...................... 475/149, 151, 475/153; 192/70.19, 69.42, 53.2, 54.4, 84.21, 84.2, 84.31, 84.1

[56] References Cited

U.S. PATENT DOCUMENTS

| | | |
|---|---|---|
| 3,359,831 | 12/1967 | Scheiter . |
| 4,009,771 | 3/1977 | Crankshaw ........................ 192/105 A |
| 4,224,841 | 9/1980 | Crooks ................................ 192/82 T X |
| 4,476,744 | 10/1984 | Crooks ............................... 192/87.11 X |
| 4,498,066 | 2/1985 | Fujiwara et al. ................ 192/84.961 X |
| 4,926,992 | 5/1990 | Linnig .............................. 192/84.21 X |
| 5,782,715 | 7/1998 | Walton et al. ............................ 475/48 |

*Primary Examiner*—Charles A. Marmor
*Assistant Examiner*—Ha Ho
*Attorney, Agent, or Firm*—Herbert Dubno; Andrew Wilford

[57] ABSTRACT

A multispeed drive for a motor-cooling fan has a shaft extending along and defining an axis and a planetary transmission including a sun gear fixed on the shaft, a planet element rotatable about the axis on the shaft and carrying planet gears meshing with the sun gear, and a ring element rotatable about the axis on the shaft and meshing with the planet gears. A fan is rotatable about the axis and fixed to one of the elements and an input member is also rotatable about the axis on the shaft adjacent the fan. Concentric electromagnetic clutches each have an output side connected to a respective one of the elements and couplable to the input member for closing and coupling the respective output side to the input member and for opening and decoupling the respective output side from the input member. Thus when both clutches are open the fan is decoupled completely from the input member.

7 Claims, 2 Drawing Sheets

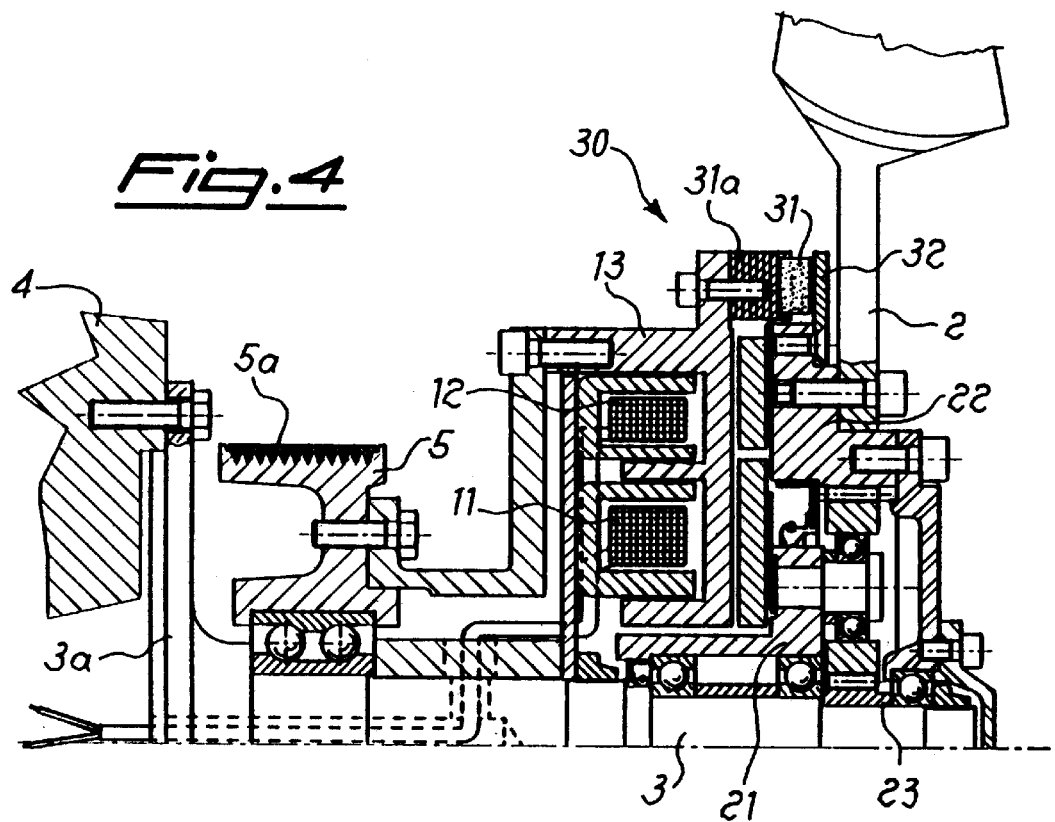
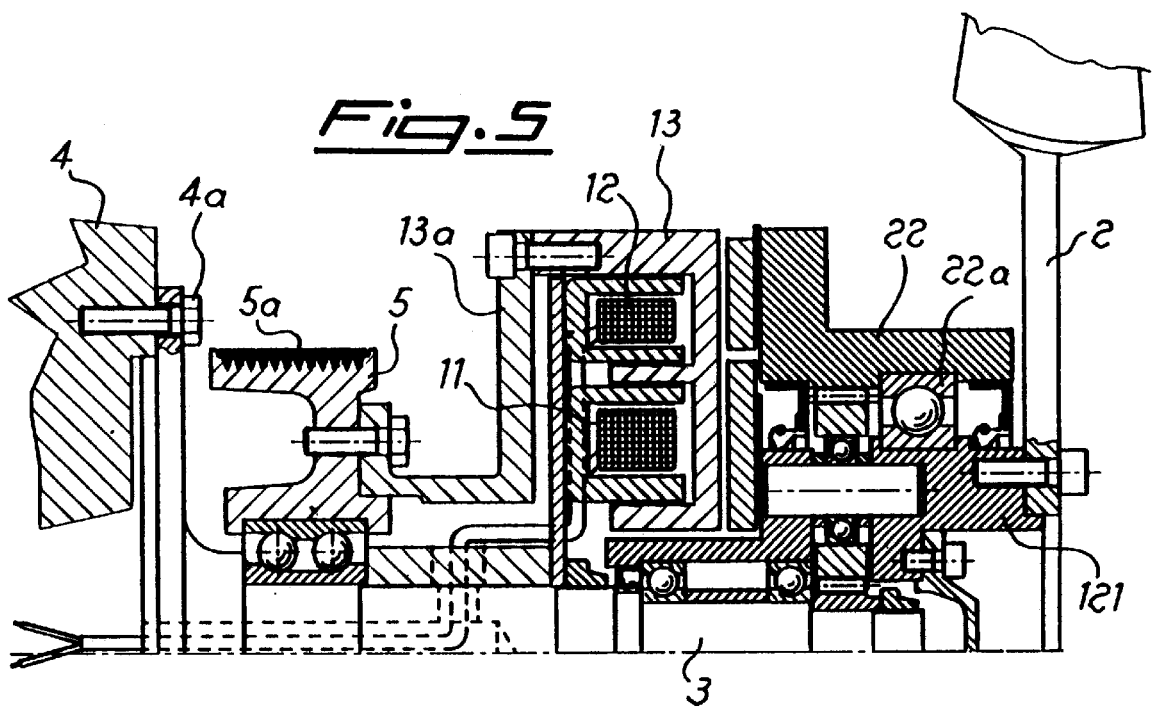

MULTISPEED DRIVE FOR ENGINE-COOLING FAN

FIELD OF THE INVENTION

The present invention relates to a device for transmitting movement to fans cooling the cooling liquid in motor vehicles, which comprises a double-body electromagnetic clutch connected to a gearing of the epicyclic type.

BACKGROUND OF THE INVENTION

It is known that in the art of cooling the cooling liquids contained in the radiators of motor vehicles there exists the need to force air onto the radiator itself in order to obtain more rapid dissipation of heat from the liquid to the outside, said forced air flow being obtained by causing rotation of a fan which is normally mounted either on the shaft of the water pump or on a driven shaft carrying a pulley which receives movement from a belt driven by the crankshaft.

It is also known that said fan must be made to rotate only when it reaches a certain predetermined water temperature which is detected by means of a thermostat which actuates an electromagnetic clutch, closing of which causes the fan to start rotating.

Said electromagnetic clutches have the drawback, however, that they start rotation of the fan at the speed of rotation of the actuating pulley, without the possibility of obtaining a variation in the speed of rotation of the fan dependent upon the variation in the speed of operation thereof.

In order to overcome these drawbacks, so-called viscous couplings have also been used, these using rotating discs which are immersed in special greases and are designed to transmit the movement to the fan; said greases are able to vary their state with an increase in the number of revolutions of the disc and are therefore able to impart a speed of rotation of the fan, which, although being dependent upon the speed of rotation of the motive part, is nevertheless different from that of the actuating pulley.

Said couplings, however, have certain drawbacks including those resulting from the fact that control of the temperature is not performed directly on the radiator water, but on a flow of air which is made to pass over an element controlling the circulation of the grease inside the coupling. This indirect measurement of the temperature, in addition to being very imprecise, requires installation of the coupling in the vicinity of the radiator, something which is not always possible for space-related reasons.

In addition to this, the viscous coupling, because of its very nature, has a reaction time which is very slow and is subject to wear of the grease, which tends to become unreliable and at a certain point is no longer able to transmit the movement to the fan with the required accuracy in response, resulting in boiling of the vehicle coolant; said viscous couplings, moreover, are unsuitable for keeping the fan at a standstill when the device is disengaged, as, instead, is required in countries which have a very cold climate.

OBJECTS OF THE INVENTION

The technical problem which is posed, therefore, is that of providing a device for transmitting the rotary movement to a fan cooling the cooling liquid in motor vehicles, which is actuated by a single pulley and associated belt and allows the fan to be operated at a predetermined number of revolutions either substantially equal to or proportional to the speed of rotation of the pulley drive shaft.

Within the scope of this problem, a further requirement is that the device should be controlled by means of direct detection of the temperature of the cooling liquid and allow the fan to be kept at a standstill or, on the other hand, allow operation thereof at a very slow speed, depending on the different and particular external climatic conditions, due to the very high or very low temperatures.

SUMMARY OF THE INVENTION

These technical problems are solved according to the present invention by a device for transmitting the movement to a fan cooling the cooling liquid in a motor vehicle, which is integral with a support element and which comprises in combination a double-body electromagnetic clutch associated with a gearing of the epicyclic type.

BRIEF DESCRIPTION OF THE DRAWINGS

Further details may be obtained from the following description of a non-limiting example of embodiment of the invention, provided with reference to the accompanying drawings, in which:

FIG. 4 shows a section similar to that of FIG. 3 with the generation of a rotary movement of the fan at a low number of revolutions; and FIG. 5 shows a section, similar to that of FIG. 1, of a variation of an example of embodiment of the device according to the invention.

SPECIFIC DESCRIPTION

Figure 1:
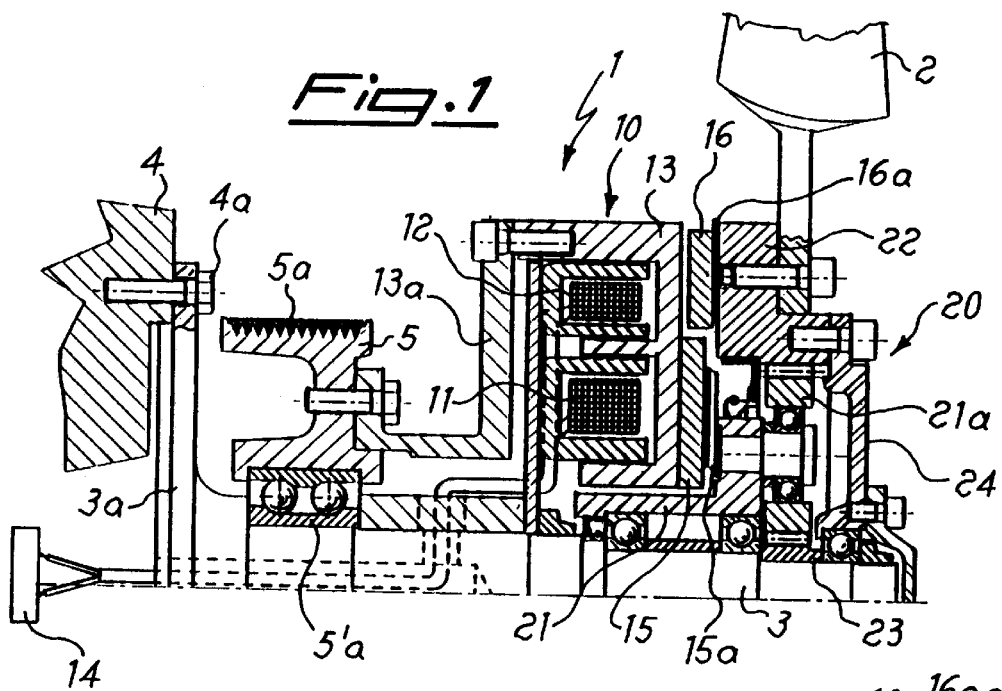
FIG. 1 shows a schematic axial section through the device for transmitting the movement to the fan according to the present invention under operating conditions with a low number of revolutions of the engine.

As illustrated in FIG. 1, the device 1 for transmitting movement to a motor-vehicle cooling fan 2 comprises a fixed shaft 3 provided with a flange 3a fixed to the body 4 of the engine by means of bolts 4a or the like. The fixed shaft 3 has, mounted on it, by means of bearings 5'a, a pulley 5 which is made to rotate by a toothed belt 5a connected to a shaft of the vehicle engine. The same shaft 3 also has, mounted on it, a double-body electromagnetic clutch 10 and a gearing 20 of the epicyclic type which is in turn connected to the fan 2.

More in detail, said clutch 10 comprises a pair of windings 11 and 12 which are arranged concentrically with respect to one another and with respect to the shaft 3 and energization of which is controlled by means of a thermostat 14 for detecting the temperature of the cooling liquid, and a rotor 13 which is connected, by means of an arm 13a, to the said pulley 5.

Said rotor 13 is designed to engage with a first armature 15 or a second armature 16 which are respectively integral with the planetary gear carrier 21 and the bell member or ring gear 22 of the said epicyclic gearing 20; respective resilient membranes 15a and 16a, designed to allow a displacement in the axial direction of the armatures themselves, being arranged between said armatures 15 and 16 and said planetary gear carrier 21 and bell member 22. As can be seen from the figures, said epicyclic gearing 20 is of the type with a sun gear 23 fixed on the shaft 3, the planetary gears 21*a* carried by the associated planetary gear carrier 21 meshing with the said sun gear and also meshing with the said bell member 22.

The epicyclic gearing 20, finally, is closed at the front by a cup member 24 designed to keep the gearing sealed so as to avoid the leakage of lubricant.

Figure 2:
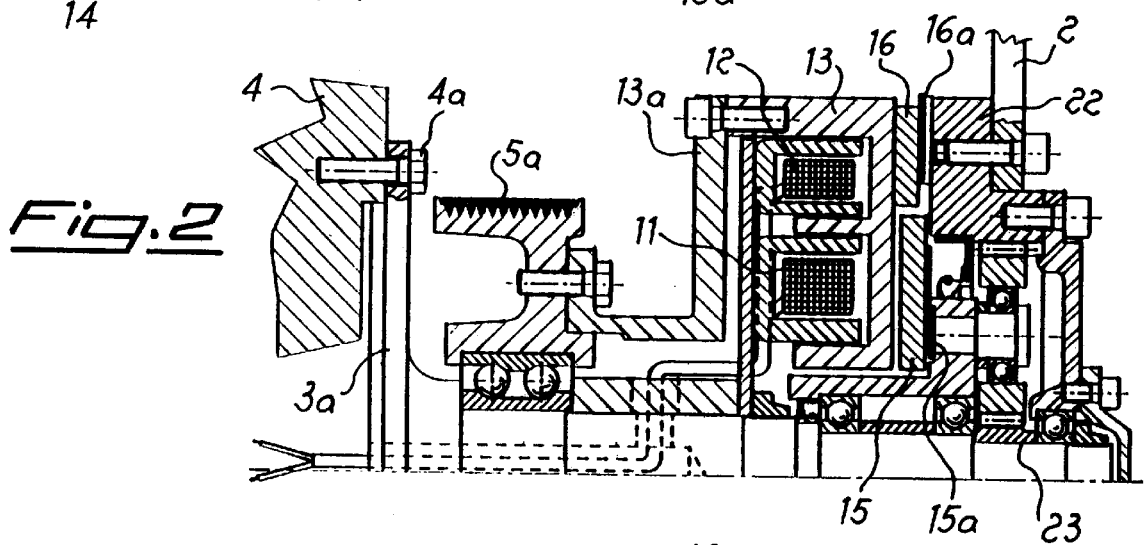
FIG. 2 shows a section similar to that of FIG. 1 under operating conditions with a high number of revolutions of the crankshaft.

The device operates in the following manner:

under conditions of low speed of rotation of the pulley 5*a* (FIG. 1), the electromagnet 11 is energized so that the armature 15 is pulled towards the rotor 13 and engages rotationally with the latter; in this way the rotational movement is transmitted to the fan 2 by means of the planetary gear carriers 21, the planetary gears 21*a* and the bell member 22 and consequently the fan rotates with respect to the pulley 5, with a number of revolutions multiplied by a factor resulting from the dimensions of the epicyclic gearing 20;

under conditions of high speed of rotation of the pulley 5 (FIG. 2), the electromagnet 11 is deactivated and the electromagnet 12 energized, thus pulling in the armature 16 coupled to the rotor 13; under these conditions the movement is transmitted to the fan 2 directly by means of the bell member 22, and the fan therefore rotates with a number of revolutions substantially identical to that of the pulley 5.

Figure 3:
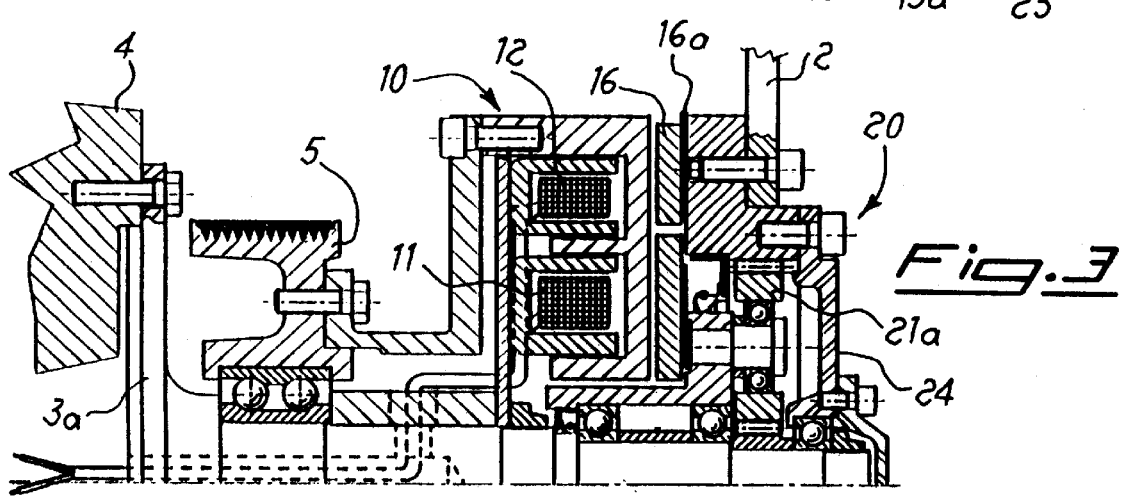
FIG. 3 shows a section similar to that of FIG. 1 with the device totally disengaged and the fan at a standstill.

As illustrated in FIG. 3 the rotational device according to the following invention also allows the fan to be kept at a standstill, as for example is required in regions with particularly severe climates where rotation, even at low speed, of the fan associated with the low external temperature would prevent the correct working temperature of the engine from being reached.

In this case it is therefore sufficient to disengage both the electromagnets 11 and 12 in order to keep the fan at a standstill, said fan, since it is mounted on the fixed shaft 3 by means of the gearing 20, not being able to rotate except by means of the connection to the belt 5*a*. If, on the other hand (FIG. 4), use of the motor vehicle is envisaged in countries with a particularly hot climate where it must be possible to keep the fan 2 rotating with a low number of revolutions even when the transmission device is disengaged, the rotor 13 can be connected to a group 30 of permanent magnets 31 which are isolated from the rotor 13 by means of a suitable spacer 31*a*; said group has a high magnetic hysteresis able to interact with a front disc 32 integral with the bell member 22 of the epicyclic gearing 20.

In this way, even when the two electromagnets 11 and 12 are deactivated, the fan 2 is driven in rotation by the permanent-magnet group 30 in turn rotating with the pulley 5 and, since driving takes places without contact, there is a substantial reduction in the number of effective revolutions of the fan compared to the number of effective revolutions of the rotor 13.

FIG. 5 finally shows a further variation of embodiment of the device according to the invention in which the fan 2 is connected to the planetary gear carrier 121 of the epicyclic gearing 20; in this case said planetary gear carrier 121 and bell member 22 have, arranged between them, a bearing 22*a* designed to centre them relative to one another.

It is therefore obvious how the device for transmitting the movement to a cooling fan for motor vehicles according to the invention enables the fan to rotate at a speed of rotation either substantially equal to the speed of rotation of the single drive belt or proportionally greater than it, it being possible, however, by means of total disengagement of the clutch, to keep the fan a standstill or, on the other hand, cause rotation thereof at a low number of revolutions should this be required by the particular climatic conditions in which the engine is used.

We claim:

1. In combination:

a shaft extending along and defining an axis;

a planetary transmission including
      a sun gear fixed on the shaft,
      a planet element rotatable about the axis on the shaft and carrying planet gears meshing with the sun gear, and
      a ring element rotatable about the axis on the shaft and meshing with the planet gears;

a fan rotatable about the axis and fixed to one of the elements;

an input member rotatable about the axis on the shaft adjacent the fan; and concentric electromagnetic clutch means each having an output side connected to a respective one of the elements and couplable to the input member for closing and coupling the respective output side to the input member and for opening and decoupling the respective output side from the input member, whereby, when both clutch means are open, the fan is decoupled completely from the input member.

2. The combination defined in claim 1 wherein the clutch means include respective annular and concentric coils one of which is within the other.

3. The combination defined in claim 2 wherein the input member includes a rotor plate lying between the coils and the output sides, the output sides being rotationally fixed on but axially displaceable relative to the respective elements, whereby energization of the coils pulls the respective output sides against the rotor plate.

4. The combination defined in claim 3, further comprising respective resilient elements carrying the output sides on the respective elements.

5. The combination defined in claim 1 wherein the fan is fixed to the ring element.

6. The combination defined in claim 1 wherein the fan is fixed to the planet element.

7. The combination defined in claim 1, further comprising:

permanent magnets on the input member; and a ferromagnetic plate fixed on the fan immediately adjacent the permanent magnets, whereby the fan is coupled magnetically to the input member at all times via the permanent magnets.

* * * * *